J. Bevis,
Washing Machine,
No. 70,508. Patented Nov. 5, 1867.
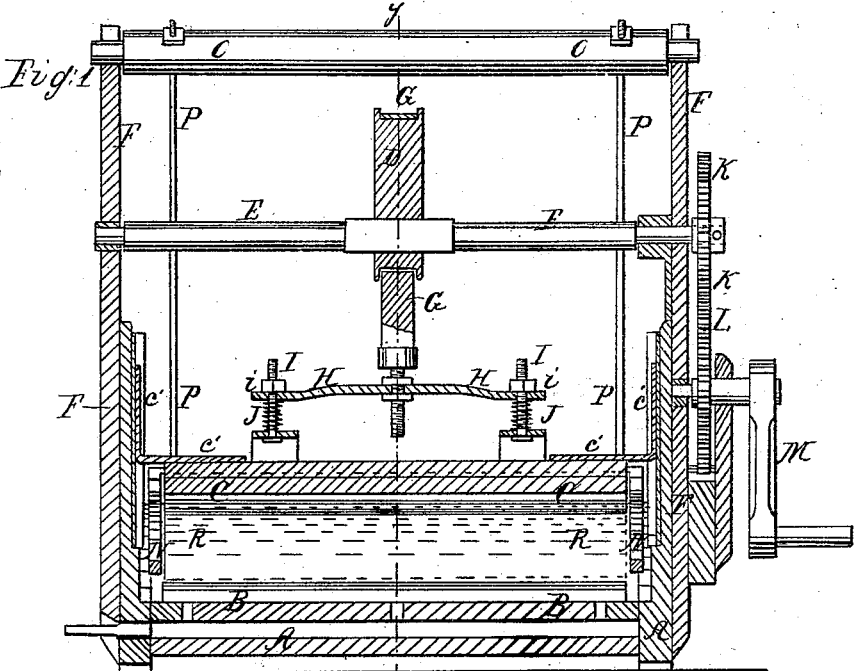
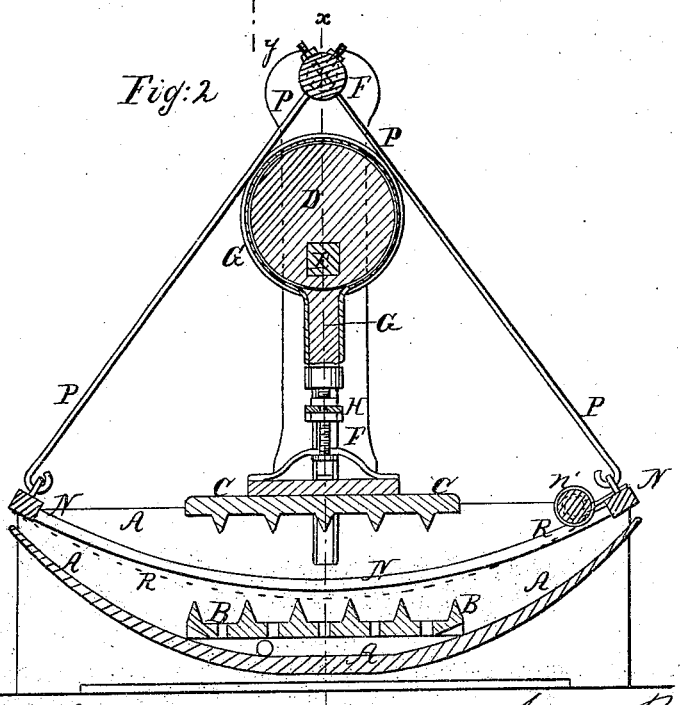
Witnesses
Theo Fuschl
W. Trewin
Inventor
Jos Bevis
Per Munn & Co
Attorneys

United States Patent Office.

JOSEPH BEVIS, OF PUTNAM, OHIO.

*Letters Patent No. 70,508, dated November 5, 1867.*

---

IMPROVED WASHING MACHINE.

---

*The Schedule referred to in these Letters Patent and making part of the same.*

---

TO ALL WHOM IT MAY CONCERN:

Be it known that I, JOSEPH BEVIS, of Putnam, in the county of Muskingum, and State of Ohio, have invented a new and useful Improvement in Washing Machine; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved machine taken through the line $x\ x$, fig. 2.

Figure 2 is a vertical longitudinal section of the same taken through the line $y\ y$, fig. 1.

Similar letters of reference indicate corresponding parts.

My invention has for its object to furnish a convenient and effective washing machine, by means of which the clothes may be washed quickly and thoroughly without friction or wear. And it consists in the combination of the stationary wash-board, movable wash-board, or presser and cam, with each other and with the tub, and in the combination of a swinging frame, having a canvas or equivalent bottom, with the wash-boards, the whole being constructed and arranged as hereinafter more fully described.

A is the tub, the sides of which are made vertical and the bottom curved or circular, as shown in fig. 2. B is a horizontal corrugated wash-board, which is secured in the central part of the tub, and which has numerous holes formed through it for the free passage of the water. It has also holes formed under its side edges, as shown in fig. 2. These holes allow the water to pass into and out of the space between the said board B and the curved bottom of the tub. C is the movable wash-board or presser, the lower surface of which is corrugated, said corrugations being so arranged as to mesh into the corrugations of the board B. The board C is raised and lowered by means of the cam D attached to the shaft E, which revolves in bearings in the standards F, attached to the tub A. G is the cam-yoke, the connecting-rod of which has a screw formed upon or attached to its lower end, and is adjustably secured to the cross-head or bar H by two nuts, one placed above and the other below the said bar H. I are bolts, connected to the wash-board C, and which pass through holes in the ends of the cross-bar H, where they are adjustably secured in place by the nuts $i$. J are springs, placed upon the bolts I, and which press up against the ends of the bar H, to give elasticity to the connection between the cam D and the wash-board C. This construction enables the board C to be so adjusted as to give the desired pressure to a greater or less quantity of clothes. The board C is made to move up and down vertically by arms $c'$, attached to its ends, and which slide up and down in guide-grooves formed upon or attached to the inner sides of the standards F, as shown in fig. 1. To one end of the shaft E is attached a gear-wheel, K, the teeth of which mesh into the teeth of the gear-wheel L, to the journal of which is attached the crank M, by which motion is communicated to the cam-shaft and cam. N is the swinging frame, which is curved to correspond with the curve of the bottom of the tub A, and which is suspended from the shaft O by the connecting-rods P. The shaft O works in bearings in the upper ends of the standards F. R is the bottom of the frame N, which is made of canvas or some other equivalent material which will support the clothes, and at the same time allow the water to pass freely through it. The canvas R may be attached directly to the end bars of the frame N. On one end may be attached a roller, $n'$, revolving in bearings at one end of said frame N, so that the tension of the bottom R may be adjusted as required.

In using the machine, the clothes to be washed are spread smoothly upon the bottom R. The crank M is then operated, and as the cam D revolves, the presser or movable wash-board C is moved downward, compressing the clothes to be washed between the said board and the stationary wash-board B, pressing out the water, which carries the dirt with it. As the board C is again raised by the cam D, the position of the frame N is changed, so that the presser may come down upon another part of the clothes, until they are thoroughly washed in all their parts.

I claim as new, and desire to secure by Letters Patent—

1. The combination of the stationary wash-board B, movable wash-board or presser C, and cam D, with each other and with the tub A, substantially as herein shown and described, and for the purpose set forth.

2. Connecting the movable wash-board C to the cam D by means of the yoke G, cross-head or bar H, bolts I, and spring J, or by an equivalent adjustable and elastic device, substantially as herein shown and described, and for the purpose set forth.

3. The combination of the swinging frame N, having a canvas or equivalent bottom, R, attached to it, with the wash-boards C and B, substantially as herein shown and described, and for the purpose set forth.

JOSEPH BEVIS.

Witnesses:
PIERSE RATLIFF,
WILLIAM CUNNINGHAM.